Figure 1:
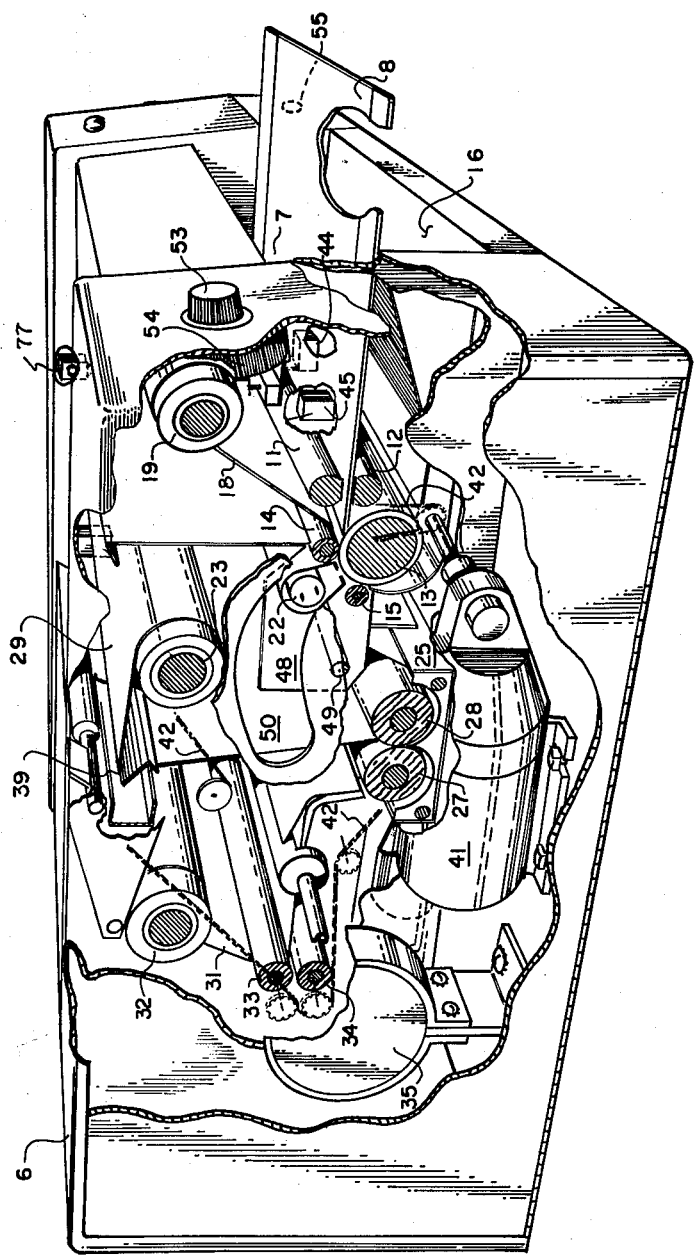

Nov. 12, 1963  F. H. FRANTZ ETAL  3,110,241
AUTOMATIC PHOTOCOPYING APPARATUS
Filed Dec. 7, 1960  3 Sheets-Sheet 1

INVENTORS
FREDERICK H. FRANTZ
STANLEY J. KLEM JR.
BY

INVENTORS
FREDERICK H. FRANTZ
STANLEY J. KLEM JR.
BY

United States Patent Office 3,110,241
Patented Nov. 12, 1963

3,110,241
AUTOMATIC PHOTOCOPYING APPARATUS
Frederick H. Frantz, Vestal, and Stanley J. Klem, Jr., Binghamton, N.Y., assignors to General Aniline & Film Corporation, New York, N.Y., a corporation of Delaware
Filed Dec. 7, 1960, Ser. No. 74,318
2 Claims. (Cl. 95—75)

This invention relates to improvements in photocopying or duplicating apparatus and, more particularly, to an automatic apparatus suitable for use in an office for making photocopies of originals.

In photocopying, based on the diffusion transfer or "peel apart" process, as disclosed in United States Patent 2,352,014 to Rott, an exposed negative and copy paper are pressed into contact with one another either during or after being submitted to a developer bath. After a suitable length of time to allow diffusion transfer to take place, the negative and the copy sheets must be manually separated or peeled apart. It is an object of this invention to provide an automatic apparatus for making copies of originals utilizing the diffusion transfer process which automatically allows time for the transfer to take place within the apparatus and further includes means for automatically separating the negative from the transfer copy paper.

In diffusion transfer copy machines, it is common to supply a light-sensitive negative sheet material of the same length or slightly larger as an original sheet to be copied and after exposing the negative, to then manually select a copy transfer material the same lenth as the exposed negative for accomplishing the developing and transfer operations prior to peeling the negative away from the transfer copy paper. It is an object of this invention to eliminate the necessity for manually supplying a negative in sheet form by providing a continuous negative web, which is stored within the apparatus on a supply roll and wound on a take-up roll and is automatically moved when it is desired to expose an original on a portion of the negative web.

It is also known in the diffusion transfer art to provide standard length cut sheet copy or transfer paper and similarly standard size cut sheet sensitized negative material, thereby to copy only similar length originals. It is the object of this invention to provide a duplicating apparatus operable on any length original sheet and automatically provide copy sheets the same length as the original, the copy sheets being cut from a copy paper web stored in roll form within the apparatus and automatically delivered to a developing means in correct relationship on length to the exposed portion of the negative web.

It is an additional object of this invention to provide an apparatus which is especially useful and time saving in that it enables a relatively inexperienced and unskilled operator to make copies of an original by setting one single control and inserting only the original to be copied into the apparatus.

Figure 2:
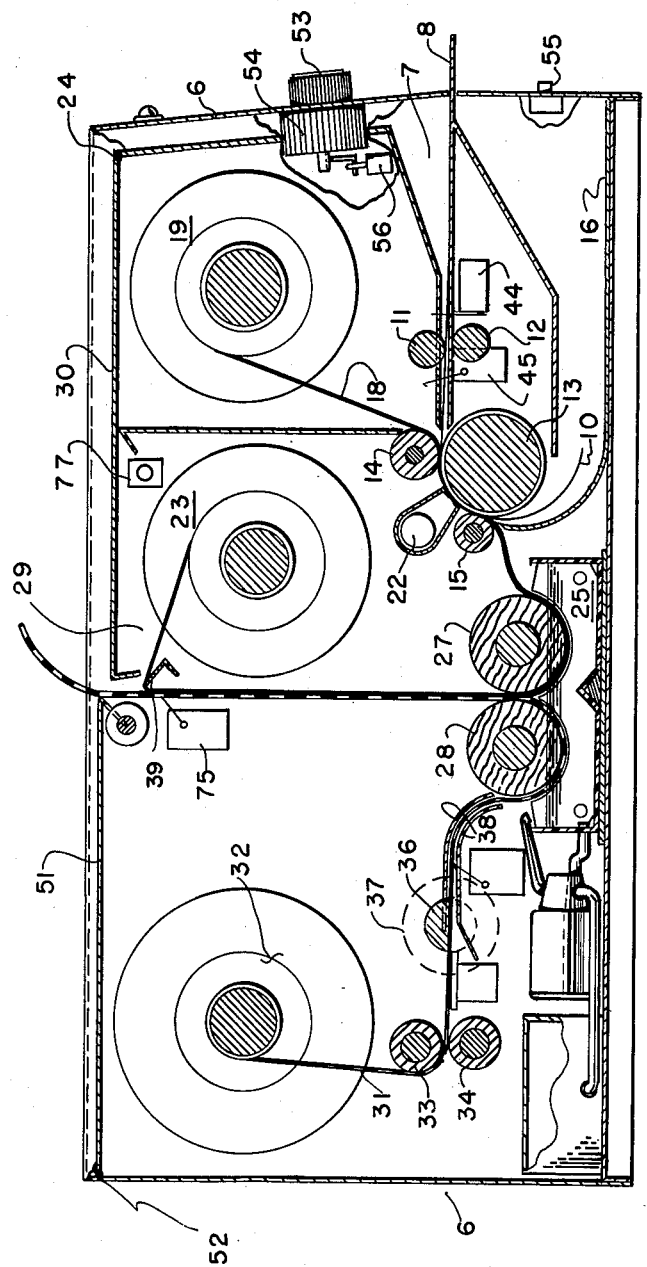
Figure 3:
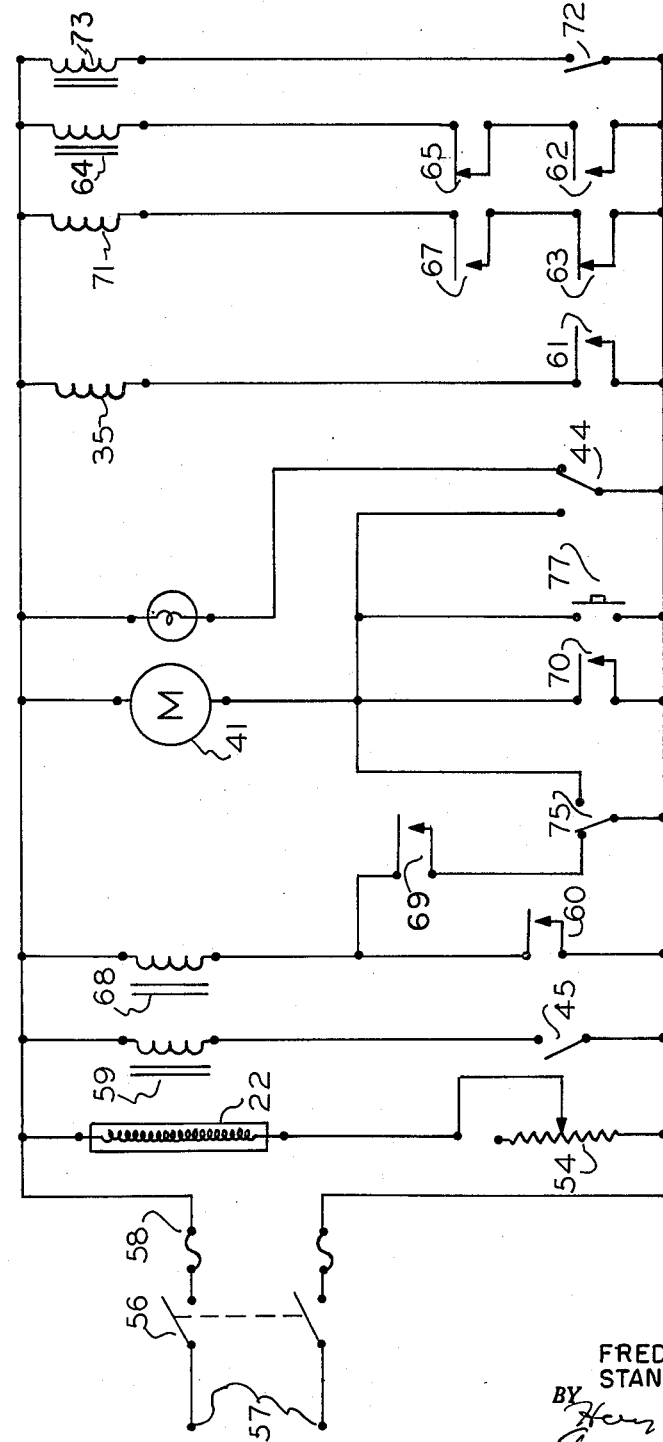

Other objects and features will be apparent from the following description of the invention, pointed out in particularity in the appended claims, and taken in connection with the accompanying drawings, in which:

FIG. 1 is a perspective view of the apparatus with a portion broken away and other components shown in section illustrating the construction of the preferred form of the apparatus of this invention, FIG. 2 is a simplified semi-schematic sectional side elevation view showing the path of movement of an original to be copied, a negative web stored within the apparatus, and a transfer copy paper, FIG. 3 is a schematic circuit diagram of the basic electrical components necessary for the automatic operation.

Referring to the drawings, particularly FIGS. 1 and 2, the automatic duplicating apparatus is provided with a casing 6 having an opening 7 in the front portion thereof through which over a feedboard 8 the original 10 to be copied may be inserted. The original 10 is fed into the machine by feed rollers 11 and 12 whereupon it passes over the periphery of the steel cylinder 13 in contact therewith and is pressed down on the surface of the cylinder by the action of rollers 14 and 15. The original 10, after passing around the cylinder 13, is deposited in a receiving tray 16 for suitable removal from the machine.

A negative web 18 is contained on a negative supply roll 19 suitably supported within the casing and is guided by rollers 14 and 15 in contact with the original 10 as the latter passes over the cylinder 13. An exposing means includes a suitable source of illumination 22, such as a tubular fluorescent light, or the like, which accomplishes the exposing of the sensitized negative web 18 in accordance with the image on the surface of the original 10 as they pass over the cylinder 13. It can be seen that the arrangement is reflex copying in that the negative web 18 is interposed between the original 10 and the light source 22 instead of being behind the original. Reflex copying has the advantage of enabling originals to be duplicated which have printed matter on both sides and also leads to a somewhat more compact construction. The neative web 18 after being exposed passes through a developer medium in the tank 25 containing a liquid developer for the diffusion transfer process and then passes between pressure rolls 27 and 28 and is guided upwardly to near the top of the machine where it executes an obtuse angle turn from the direction of movement. Because of the light sensitivity of the negative web on the supply and take-up rolls 19 and 23, respectively, the portion of the casing containing these rolls includes a light tight compartment 29 to which access may be had by a cover 30 hinged at 24, allowing the negative web roll to be replaced as necessary.

Transfer copy paper 31 is contained in a further compartment within the casing on a transfer copy supply roll 32. The web of transfer copy paper 31 is fed from the supply roll 32 by feed rollers 33 and 34 controlled by a magnetic clutch 35 (FIG. 1). The transfer copy paper web is guided past a severing means including a knife blade 36 actuated by a rotary solenoid 37 providing a positive action non-jamming type of severing mechanism. The transfer copy paper 31 is then fed between the guide plates 38 into the developer tank 25 in contact with the exposed negative web, between the nip of pressure rolls 27 and 28. Pressed into contact by these rollers, the negative web and copy paper are fed upwardly a predetermined distance at a predetermined speed toward an outlet opening for the copy paper. The distance and speed of travel of the copy paper and the negative web determine the time provided by the apparatus for diffusion transfer to take place.

Mounted in the upper portion of the interior of the machine adjacent to the negative web take-up roll 23 is a "peel-apart" means which automatically separates the copy paper 31 from the negative web 18. The "peel-apart" means include a separator guide plate 39 supported by the inner side walls of said casing 6, and of L shaped construction and tilted to the take-up roll 23 in the direction transverse to the light-sensitive material 18. Due to the slope of the plate 39 the negative web is constrained to follow a sharp obtuse angle relative to the vertical path coming from the squeegee rollers 27 and 28. The abrupt change in direction of the negative web passing over the separator guide plate 39, without any change in the direction of the copy paper 31, causes the positive print to automatically separate from the negative web and following a vertical path, it is delivered through an outlet opening 40 in the top of the casing 6.

As shown in FIG. 1, a main drive motor 41 drives a chain 42 connected around various gears and pinions to drive the various feed rolls for feeding the negative web 18 and the transfer copy paper 31 at the same rate of speed.

The copy paper 31 is fed from the supply roll 32 under the control of the magnetic clutch 35 in accordance with the sensing of an original 10 inserted into the casing through opening 7. Microswitches 44 and 45 are provided with actuators extending into the path of the original 10 being fed to the exposing means to be copied. Microswitch 44 detects the leading edge of the original 10 and starts the drive motor 41 thereby driving the original by means of feed rollers 11 and 12 to the exposure cylinder 13 and then into the original receiving tray 16. At the same time, the drive motor 41 actuates the negative web take-up roll 23 for winding up the negative web fed by rollers 14 and 15 from supply roll 19 past the exposing means and through the developing means. The second microswitch 45 senses that the original is nearing exposing position and actuates the magnetic clutch 35 which is coupled to feed rollers 33 and 34 thereby starting the feed of the copy paper 31. When the trailing edge of the original passes microswitch 45 it de-energizes the magnetic clutch 35 and stops the paper feed by rolls 33 and 34. At the same time, the severing means, including knife 36 is electrically actuated under control of microswitch 45 to sever the web of copy transfer paper 31.

It is noted that the distance between the point of severing by knife 36 and the point of contact between the transfer copy paper 31 and the negative web 18 at the nip of rolls 27 and 28 is the same as the lineal distance of travel from the microswitch 45 to the nip of rolls 27 and 28 so that both webs being driven at the same speed, the leading and trailing edges of the cut sheet of the copy paper 31 will arrive and coincide with the exposed portion of the negative web. Also, since the feeding commenced on sensing of the leading edge of the original by microswitch 45 and stopped at the sensing of the trailing edge hereof by the same microswitch, the length of the severed sheet of copy paper fed will be the same length as the original copied.

Relative to the mechanical construction, for convenience in threading the negative web 18 from the roll 19 around the exposure cylinder 13, lamp unit 22 is affixed to movable end plates 48 and pivoted about a shaft 49 which has a horizontal axis through the casing. Rollers 14 and 15 keep the negative paper and the original in tight contact during the exposing period by the lamp 22 and the whole lamp assembly is adapted to retract back within slot 50 (FIG. 1). The end of the negative paper web may be inserted in the take-up roller 23 when the lamp assembly is so retracted. Loading of the positive paper web 31 on roll 32 may be accomplished by lifting a cover section 51 which is hinged at 52 to the rear portion of the casing 6.

Simple controls such as a knob 53 for controlling a variable resistance 54 for the lamp 22 and a momentary switch 55 for web loading are located on the outside of the casing.

The operation will be described in connection with the circuit diagram of the FIG. 3 which illustrates in detail the automatic operation of the various components of the apparatus.

The electrical circuit, which is necessary to bring about the proper sequencing of the operations in this machine is shown in FIG. 3 and will be described with reference to the detailed operation of the apparatus. Power is applied by rotation of the knob 53 which closes switch 56 and passes current from a source 57 to a fuse panel 58. This energizes the lamp 22 (see also FIG. 2) and renders the rest of the circuit ready for operation.

On insertion of an original 10 to be copied over the feedboard 8, the leading edge of the original contacts the actuating arm of microswitch 44 and energizes drive motor 41 which, in turn, through suitable chain and sprocket connections, drives the rollers 14 and 15 to feed the original 10 to the exposing cylinder 13.

In traveling toward the exposing cylinder 13, the leading edge of the original 10 contacts the actuating arm of the second microswitch 45 normally biased to the open position. Closing microswitch 45 energizes relay 59, which relay controls contacts 60, 61, 62 and 63. The energizing of relay 59 acts to close normally open contacts 60, 61 and 62 and opens normally closed contact 63. When contact 62 closes, relay 64 is energized through closed contacts 65 thereof, but the energizing of relay 64 opens contact 65 and closes contact 67. Simultaneously, the closing of contact 60 by relay 59 energizes relay 68 which controls and closes contacts 69 and 70. Contact 61 closed by relay 59, energizes the magnetic clutch 35 which imparts motive force to rollers 33 and 34, which feed the positive paper stock. When the trailing edge of the original 10 passes the actuating arm of microswitch 44, the switch returns to its biased normally open position, de-energizing relay 59 which in turn opens contacts 60, 61 and 62 and thus de-energizes the magnetic clutch 35. This instantly stops the feed of the copy paper 31. The energizing of relay 59 also closes contact 63 which allows current to pass through closed contact 67 thereby energizing the solenoid 71 which actuates the knife 36 to cut the copy paper at the same time the trailing edge of the original leaves the position of microswitch 45. Maximum stroke of the solenoid 71 actuates switch 72 and energizes coil 73 of relay 64 returning the relay contacts to normal position, i.e., opening contact 67 and closing contact 65.

After original 10 to be copied has been fed into contact with the negative web, it passes the light source 22 where the sensitized negative web 18 is exposed in accordance with the image on the original. The negative web 18 and the original 10 are guided over cylinder 13 by the rollers 14 and 15. The intensity of the light 22 is controlled by rheostat 54 which is manually regulated by the knob 53. The intensity of this light is set by the operator to a value which is most responsive to the requirements of the particular paper used. The exposed original is then separated from the negative web and deposited in the tray 16 where it can easily be retrieved by the operator. The negative web 18 passes to the developer tray 25 for immersion in a suitable developer contained therein. Simultaneously, the copy paper 31, now cut from the web in a sheet having a length identical with that of the original is guided through the developer. The pressure rollers 27 and 28 press the positive paper into intimate contact with the negative web after their immersion in the developer so that the image of the negative web can be developed and then transferred to the copy paper. The negative web 18 and copy paper 31 remain in contact for the length of time necessary to reach the separator guide plate 39. The time interval for this travel, as determined by the speed and distance, is sufficient to allow a complete transfer of the image to the copy paper. Prior to arrival at the separator guide plate 39, the leading edge of the copy paper 31 contacts an actuating arm of switch 75 which moves the switch contacts from the position shown in FIG. 3 to keep the drive motor 41 energized after microswitch 44 returns to its normal position shown in FIG. 3. Switch 75 is normally biased open and is closed by contact with the copy paper. When the trailing edge of the copy paper passes the actuating arm switch 75, the motor energizing circuit is opened shutting off the drive.

Switch 77 is a manually operated momentary contact switch, located on the inside right end shell of the casing 6, FIGS. 1 and 2, and operates the drive mechanism for feeding the negative web past the exposing means through the developer means and to the negative web take-up roll 23. This switch is employed to thread the negative web through the machine when installing a fresh roll.

From the foregoing, it is evident that the internal operation of the apparatus is entirely automatic, being activated when energized merely by the insertion of an original to be copied.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. Photocopying apparatus designed for producing photocopies from an original by means of the diffusion transfer process which comprises in combination:
    (a) a housing containing all component elements of the apparatus herein recited, said housing having an inlet opening for an original, an exposure station, a developing station, an outlet opening for the finished copy and a receiving tray for the exposed original,
    (b) a supply roll containing a web of light-sensitive material and a take-up roll therefor,
    (c) A supply roll containing a web of transfer material,
    (d) rollers for feeding and guiding said light-sensitive material from said storage roll, past said exposure station and past said developing station and onto said take-up roll,
    (e) rollers for feeding and guiding said transfer material from said storage roll past said developing station and through said outlet opening,
    (f) rollers for feeding and guiding said original from said inlet opening, past said exposure station and into said receiving tray,
    (g) motor means for driving said rollers,
    (h) sensing means at said inlet opening actuated by the leading edge of said original for initiating the operation of said motor means and for maintaining operation thereof while said original is passing said exposure station, and for initiating the feeding of said transfer material from said roll,
    (i) knife means for severing said transfer material,
    (j) sensing means actuated by the trailing edge of said original for operation of said knife means, whereby the length of said transfer material corresponds to the length of said original,
    (k) pressure roller means at said developing station for immersing said exposed light-sensitive material and said severed sheet of transfer material into a developing solution and for pressing said materials into intimate contact for effecting image transfer, said sheet of transfer material adhering to said light-sensitive material and traveling therewith toward said outlet opening,
    (l) separator means near said outlet opening constraining said light-sensitive material being wound onto said take-up roll to follow abruptly a path in a direction at an obtuse angle from that of the path of said transfer material, and
    (m) sensing means located near said outlet opening and actuated by the trailing edge of said severed sheet of said transfer material emerging from said outlet opening for stopping the operation of said motor means.

2. Apparatus in accordance with claim 1 wherein said separator means comprises a guide plate supported within said housing and located near said outlet opening and positioned transverse to the web of light-sensitive material, said plate being of L shaped construction and tilted in the direction of said take-up roll, said light-senstive web being threaded onto said take-up roll over the edge of said plate.

References Cited in the file of this patent
UNITED STATES PATENTS

| | | |
|---|---|---|
| 2,732,778 | Limberger | Jan. 31, 1956 |
| 2,780,972 | Fairbanks | Feb. 12, 1957 |
| 2,804,304 | Taini | Aug. 27, 1957 |
| 3,031,941 | Moser | May 1, 1962 |